(12) United States Patent
Essien et al.

(10) Patent No.: US 12,043,035 B2
(45) Date of Patent: Jul. 23, 2024

(54) AEROSOL-BASED PRINTING CARTRIDGE AND USE THEREOF IN APPARATUS AND METHOD OF USE THEREOF

(71) Applicant: INTEGRATED DEPOSITION SOLUTIONS, INC., Albuquerque, NM (US)

(72) Inventors: Marcelino Essien, Albuquerque, NM (US); David M. Keicher, Albuquerque, NM (US)

(73) Assignee: Integrated Deposition Solutions, Inc., Albuquerque, NM (US)

( * ) Notice: Subject to any disclaimer, the term of this patent is extended or adjusted under 35 U.S.C. 154(b) by 56 days.

(21) Appl. No.: 17/762,496

(22) PCT Filed: Sep. 25, 2020

(86) PCT No.: PCT/US2020/052616
§ 371 (c)(1),
(2) Date: Mar. 22, 2022

(87) PCT Pub. No.: WO2021/062080
PCT Pub. Date: Apr. 1, 2021

(65) Prior Publication Data
US 2022/0410579 A1     Dec. 29, 2022

Related U.S. Application Data

(60) Provisional application No. 62/905,571, filed on Sep. 25, 2019.

(51) Int. Cl.
*B41J 2/175*     (2006.01)
(52) U.S. Cl.
CPC ................... *B41J 2/17513* (2013.01)

(58) Field of Classification Search
CPC .. B41J 2/17513; B41J 2/17556; B41J 2/1707;
B41J 2/17553; B05B 7/0012;
(Continued)

(56) References Cited

U.S. PATENT DOCUMENTS

| 4,463,362 A | 7/1984 | Thomas |
| 8,887,658 B2 | 11/2014 | Essien et al. |

(Continued)

FOREIGN PATENT DOCUMENTS

| GB | 2158731 A | * 11/1985 | ............. B01D 45/10 |
| JP | 2007507114 A | 3/2007 | |

(Continued)

OTHER PUBLICATIONS

Supplementary European Search Reported issued in European Patent Appln. No. EP20870359, dated Sep. 12, 2023.
(Continued)

*Primary Examiner* — Jason S Uhlenhake
*Assistant Examiner* — Alexander D Shenderov
(74) *Attorney, Agent, or Firm* — MaxGoLaw PLLC

(57) ABSTRACT

An aerosol-based printing apparatus is provided capable of producing an aerosol stream at a constant rate and constant material deposition to a substrate to provide high-definition, high-resolution traces. The aerosol-based printing apparatus provides production, transport, and delivery of an aerosol stream at a constant rate for a period of time of at least 8 hours and other instances more than 24 continuous hours of constant operation. By inhibiting bulging and necking of the deposited trace, superior line width tolerances are achieved, and such tolerances are maintained for extended periods of time, thereby allowing for both the deposition of complex traces as well as consistent manufacture of duplicate articles that maintain the tolerances across a production ran. The accumulation of fluids in the aerosol and gas transport (Continued)

conduits are eliminated, thereby eliminating the need for purge or cleaning cycles and allowing for uninterrupted operation for a minimum of 24 hours.

20 Claims, 17 Drawing Sheets

(58) Field of Classification Search
CPC ............ B05B 7/0081; B05B 17/0615; H01M 4/8832; Y02E 60/50
USPC .......................................................... 347/86
See application file for complete search history.

(56) References Cited

U.S. PATENT DOCUMENTS

| | | | |
|---|---|---|---|
| 2004/0046130 A1* | 3/2004 | Rao | C23C 4/134 250/492.1 |
| 2004/0197493 A1 | 10/2004 | Renn et al. | |
| 2005/0248636 A1 | 11/2005 | Lui | |
| 2006/0065267 A1* | 3/2006 | Tran | A61M 11/02 128/200.14 |
| 2008/0250765 A1* | 10/2008 | Lane | B01D 45/16 55/495 |
| 2013/0029032 A1 | 1/2013 | King et al. | |
| 2016/0193627 A1 | 7/2016 | Essien | |
| 2018/0015730 A1* | 1/2018 | Essien | B41J 2/17596 |

FOREIGN PATENT DOCUMENTS

| | | |
|---|---|---|
| JP | 2011502741 A | 1/2011 |
| WO | 2012026963 A2 | 3/2012 |

OTHER PUBLICATIONS

Int'l Search Report for PCT/US2020/052616, dated Jan. 12, 2021.
Machine translation of Office Action issued in corresponding Japanese Patent Appln. No. 2022-519386, dated May 31, 2024.

* cited by examiner

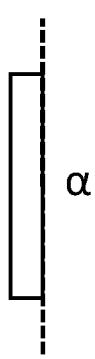
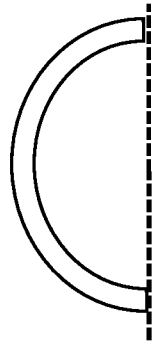
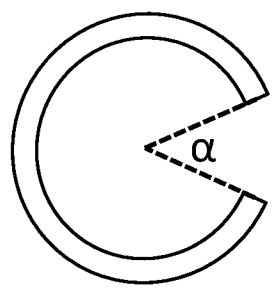
FIG. 2A          FIG. 2B          FIG. 2C
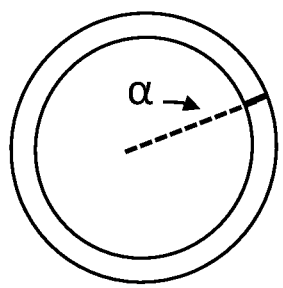
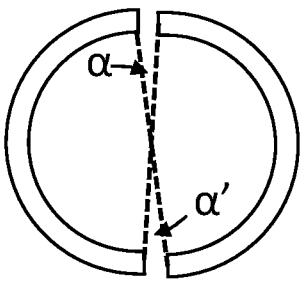
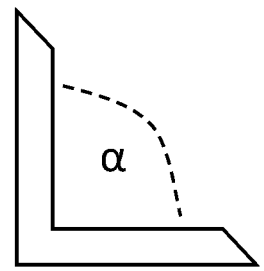
FIG. 2D          FIG. 2E          FIG. 2F
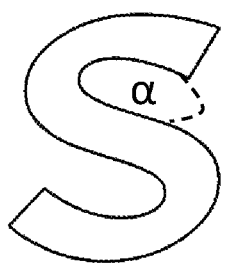
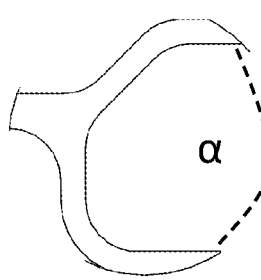
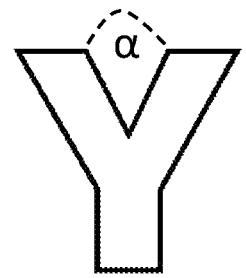
FIG. 2G          FIG. 2H          FIG. 2I (Section A-A')

(Section B-B')

(Section C-C')

(Section D-D')

(Section E-E')

(Section F-F')

AEROSOL-BASED PRINTING CARTRIDGE AND USE THEREOF IN APPARATUS AND METHOD OF USE THEREOF

CROSS-REFERENCE TO RELATED APPLICATION

This application claims priority of U.S. Provisional Patent Application Ser. No. 62/905,571 filed Sep. 25, 2019, which is incorporated herein by reference.

FIELD OF THE INVENTION

The present invention in general relates to aerosol printing, and in particular to devices that use aerosol-based printing to deposit high-density, high-resolution traces on a surface.

BACKGROUND OF THE INVENTION

Direct Write printing, defined as maskless printing of discreet patterns on a substrate in a one-step process offers many advantages to conventional printing technologies such as lithography and chemical and physical vapor deposition. Indeed, Direct Write processes such as aerosol-based printing are far less expensive to establish and maintain and offer greater flexibility than conventional techniques.

Typically, in aerosol-based printing aerodynamic lenses are used. The use of aerodynamic lenses to focus an aerosol stream is well known as described by Peng Liu, Paul J. Ziemann, David B. Kittelson, and Peter H. McMurry, Generating Particle Beams of Controlled Dimensions and Divergence: I. Theory of Particle Motion in Aerodynamic Lenses and Nozzle Expansions, *Aerosol Science and Technology,* 22:3, 293-313 (1995). An aerodynamic lens is defined as a flow configuration in which a stream traveling through a cylindrical channel with diameter D is passed through an orifice with diameter d, undergoing one contraction upstream of the orifice and one subsequent and immediate expansion downstream of the orifice. A contraction of an aerosol stream is produced as the flow approaches and passes through the orifice. The gas then undergoes an expansion as the flow propagates downstream into a wider cross-sectional area. Flow through the orifice forces particles towards the flow axis, so that the aerosol stream is narrowed and collimated to provide the functional attributes of a lens. Aerosol streams collimated by an aerodynamic lens system have been designed for use in many fields, including pharmaceutical aerosol delivery and additive manufacturing. In the typical aerodynamic lens system, an aerosol stream is tightly confined around the axis of a flow cell by passing the particle distribution through a series of axisymmetric contractions and expansions. Each section of the lens system consisting of a flow channel and an orifice is defined as a stage. Liu has presented a method and apparatus for focusing sub-micron particles using an aerodynamic lens system. Di Fonzo et. al. and Dong et al. have designed lens systems that focused particles with diameters in the range from 10 to 100 nanometers and 10 to 200 nanometers, respectively. Di Fonzo, F., Gidwani, A., Fan, M. H., Neumann, D., Iordanoglou, D. I., Heberlein, J. V. R., McMurry, P. H., Girshick, S. L., Tymiak, N., Gerberich, W. W., and Rao, N. P., "Focused nanoparticle-beam deposition of patterned microstructures," Appl. Phys. Lett. 77(6), 910 (2000). Dong, Y., Bapat, A., S. Hilchie, U. Kortshagen and S. Campbell, "Generation of nano-sized free standing single crystal silicon particles", Journal of Vacuum Science & Technology B: Microelectronics and Nanometer Structures Processing, Measurement, and Phenomena 22, 1923 (2004).

Wang has designed a lens system to focus particles in the range of 3 to 30 nanometers. Lee has reported a method of focusing micron-sized particles at atmospheric pressures using a single lens system composed of multiple stages. Lee, J-W, et. al. "Inertial focusing of particles with an aerodynamic lens in the atmospheric pressure range", Aerosol Science 34 (2003) 211-224.

In U.S. Pat. No. 6,348,687, Brockmann discloses an apparatus for generating a collimated aerosol beam of particles with diameters from 1 to 100 microns. The aerodynamic lens system of Brockmann uses a series of fixed lenses and an annular sheath gas surrounding a particle-laden carrier gas. The system of Brockmann was used to focus 15-micron aluminum particles to a diameter of 800 microns, and generally uses the same aerosol and sheath gas flow rates. In U.S. Pat. No. 7,652,247, Lee discloses an aerodynamic lens system for focusing nanoparticles in air with diameters between 5 and 50 nanometers. In U.S. Pat. No. 8,119,977, Lee discloses a multi-stage, multi-orifice aerodynamic lens for focusing a range of particle diameters covering two orders of magnitude, from 30 to 3000 nanometers. In U.S. Pat. No. 6,924,004, Rao discloses a method and apparatus for depositing films and coatings from a nanoparticle stream focused using an aerodynamic lens system. The apparatus of Rao uses high-speed impaction to deposit nanoparticles on a substrate. A method of separating particles from a gas flow using successive expansions and compressions of the flow created by an aerodynamic lens is discussed by Novosselov in U.S. Pat. No. 8,561,486.

Hydrodynamic focusing using a sheath gas is generally accomplished by propagating an annular sheath/aerosol flow through a continuously converging nozzle, using differing sheath and aerosol gas flow rates. The degree of focusing is proportional to the ratio of the gas flows. In U.S. Pat. No. 7,108,894, Renn discloses a method of particle focusing using a coaxial sheath gas flow that surrounds an aerosol-laden carrier gas. The combined flow is then propagated through a converging nozzle. Renn teaches that for the operational range of a flow system using a sheathed aerosol stream and a single converging nozzle, the diameter of the focused beam is a strong function of the ratio of the sheath to aerosol gas flow rates.

Focusing of a stream of aerosol particles using a system of aerodynamic lenses was first reported by Liu as cited above. The system of Liu was used to narrow and collimate a beam of spherical particles with diameters of approximately 25 to 250 nanometers. Liu used a lens system having three to five stages, with emphasis placed on achieving a low pressure drop across each lens. Numerous experimental and theoretical studies have been performed after the work of Liu, considering the aerodynamic effects of single and multi-orifice lens configurations.

Many researchers have reported studies of aerodynamic focusing of aerosol streams using fixed multi-stage lens systems (Lee, Brockmann, and Liu). Lee discloses an aerodynamic lens for focusing nanoparticles with diameters ranging from 30 to 3000 nanometers. Brockmann describes a multi-stage lens system that focuses large, solid particles. The Brockmann apparatus also uses an annularly flowing sheath gas to prevent impaction of particles onto the orifice surfaces. The apparatus of Brockmann propagates a sheath gas flow through the entire multi-stage lens system. Liu has disclosed an apparatus for focusing nanoparticles using an aerodynamic system consisting of three stages.

Prior art attempts at aerosol-based printing have met with limited success in part owing to the frequent requirements for servicing. As a result, reliable manufacturing-scale reproduction has been hampered by limited throughput and lack of maintenance of reproducible tolerances. One source of the need for service has been fluid accumulation along the flow path and in particular at the gas input, the aerosol output, and combinations of both.

Thus, there exists a need for an aerosol-based printing apparatus that inhibits fluid accumulation in the gas and aerosol transport conduits. There further exists a need for a method of operating an aerosol-based printing apparatus capable of providing a stable aerosol stream at a constant material deposition rate to a substrate to provide high-definition, high-resolution traces continuously for more than 8 hours without service.

SUMMARY OF THE INVENTION

An aerosol printing ink jet cartridge is provided. The cartridge includes a housing, a vial adapted to store an aerosol ink, and at least one internal baffle extending from an interior wall of the housing and in fluid communication with the detachable vial to define an aerosol chamber. A gas inlet tube is adapted to provide an inlet gas into, or adjacent to the aerosol chamber; and an outlet channel in fluid communication with the aerosol chamber through which aerosol ink as particles are outputted. The at least one baffle is a single baffle, and has a shape that is planar, arcuate, split cylindrical, angular, S-shaped, or Y-shaped.

An apparatus is provided for printing discrete high-resolution high-density features on a surface using an aerosol stream that utilizes the aerosol printing ink jet cartridge as described above. The apparatus has an atomizer positioned to atomize the aerosol ink, a flow cell including at least one aerodynamic lens and one converging fluid dispensing nozzle with a sheath gas flow there around, and a non-contact pneumatic shuttering assembly positioned to selectively interfere with a stream from the nozzle. The atomizer has variable, continuous or pulsed excitation.

A method is provided for printing traces on a substrate using the apparatus described above. The method includes providing aerosol ink in a vial, inputting an aerosol transport gas into a cartridge through a gas inlet tube or gas inlet port, nebulizing the aerosol ink using an ultrasonic transducer of an atomizer to create an aerosol-laden gas. Subsequently, a sheath gas is introduced into the atomizer through a port to form an annular coaxial flow with the aerosol-laden gas to create a combined flow, passing the combined flow through a flow cell, and outputting the aerosol-laden gas from an output port at a constant flow rate. The method allows for unassisted printing continuously for between 8 and 24 hours.

BRIEF DESCRIPTION OF THE DRAWINGS

The present invention is further detailed with respect to the following drawings that are intended to show certain aspects of the present invention but should not be construed as a limit on the practice of the present invention.

FIGS. 2A-2I are bottom views of a variety of baffles operative in the present invention;

DETAILED DESCRIPTION OF THE INVENTION

Figure 1A:
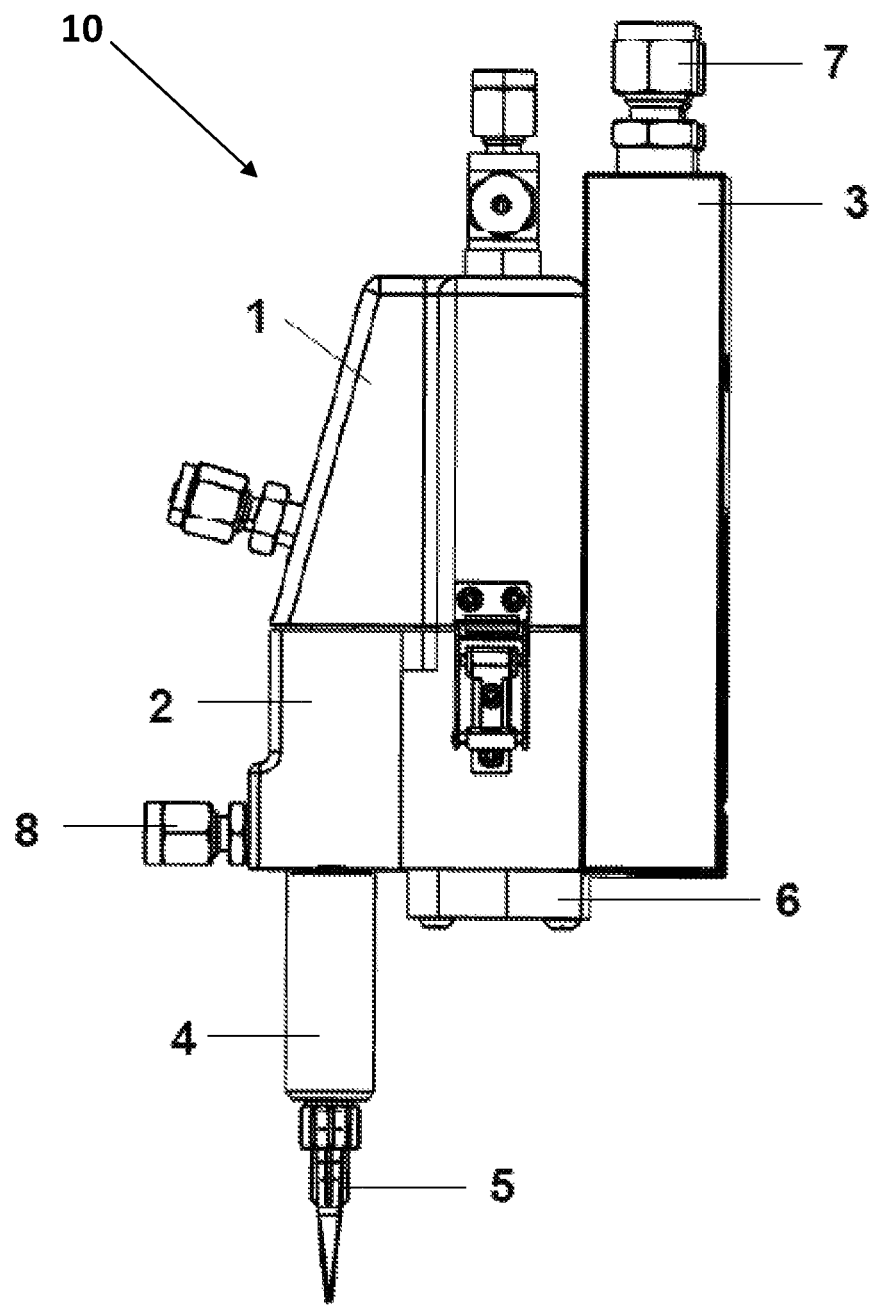
FIG. 1A is a plan view of an inventive print head inclusive of an interchangeable ink cartridge, an atomizer base, a cold plate, a flow cell, and a fluid dispense tip.

The present invention has utility as an aerosol-based printing apparatus capable of providing an aerosol stream at a constant rate and constant material deposition to a substrate to provide high-definition, high-resolution traces. The inventive apparatus provides production, transport, and delivery of an aerosol stream at a constant rate for a period of time of at least 8 hours and other instances more than 24 continuous hours of constant operation. The present invention through inhibiting bulging and necking of the deposited trace achieves superior line width tolerances, and is able to maintain such tolerances for extended periods of time, thereby allowing for both the deposition of complex traces as well as consistent manufacture of duplicate articles that maintain the tolerances across a production run. The present invention also eliminates the accumulation of fluids in the aerosol and gas transport conduits, eliminating the need for purge or cleaning cycles and allowing for uninterrupted operation for a minimum of 24 hours.

The present invention provides an apparatus capable of printing fine lines with sub-micron edge definition, enabling printing of 10-micron traces with 10-micron spacing. The apparatus produces a constant aerosol output for at least 24 hours at the substrate and isolates the transport gas input port and flow path and the aerosol output port and flow path from the agitated fluid produced by the atomization process of the invention to overcome the prior art problem of fluid accumulation.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to specify all permutations, combinations, and variations thereof exhaustively.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only, and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Embodiments of the present invention offer a method and apparatus for aerosol-based direct printing of discrete patterns using a multi-lens aerodynamic focusing assembly and a material shuttering assembly that is internal to the print head of the apparatus. The apparatus of the invention produces discrete patterns by shuttering a continuous stream of aerosol particles using a pneumatic shutter. According to embodiments, the apparatus includes a print module, a process vision module, a part alignment module, a shutter assembly, a process control module, and a motion control module. The print module includes an aerosolization source, a pressure source, and a print head. The process vision module provides real-time viewing of the deposition process. The alignment module is used to define the vector distance between the axis of an alignment camera and one or more print heads, and for substrate alignment. The process control module provides computerized control and monitoring of gas flow rates and process temperature and monitoring of the system pressure. The motion control module provides computer-controlled multi-axis motion of the substrate and coordinated shuttering of the aerosol stream. Rao, N. P., "Aerodynamic focusing of particles in viscous jets," Journal of Aerosol Science, 24, Issue 7, October 1993, Pages 879-892.

The invention is capable of printing features from approximately 5 to 500 microns and in some embodiments with a width of 10 microns separated by as little as 10 microns and at shuttering speeds as fast as approximately 10 milliseconds.

According to embodiments the invention isolates the aerosol transport gas entry port and a gas delivery path from the ink fluid. The atomization process results in agitation of ink that can lead to entrainment of ink in the flow path of the gas used to transport aerosolized ink droplets. Isolation of the gas flow path from the ink fluid is critical and is accomplished according to the present invention using internal ink cartridge baffles.

Another important aspect of high-definition high-density aerosol printing is the stable transport of aerosolized ink from the ink cartridge to the system's flow cell. Fluid entrainment in the ink cartridge ports and channels can cause alternating blocking and clearing of the aerosol flow path and aerosol output port, leading to variation in the aerosol deposition rate. According to the present invention, fluid entrainment in the aerosol flow path is eliminated to produce stable printing such that printing can operate for a minimum of 24 hours without service interruption, with the provision that ink and input gas supplies are maintained. In some inventive embodiments, stable printing occurs for more than 40 hours.

Referring now to the figures, FIG. 1A shows an inventive embodiment of the print module shown generally at 10 and includes an ink cartridge 1, an atomizer base 2, a cold plate 3, a flow cell 4, and a fluid dispense tip 5. An ultrasonic transducer 6 nebulizes an ink sample, forming an aerosol that is transported from the atomizer base 2 to the flow cell 4. A sheath gas enters the atomizer base 2 through port 8 and forms an annular coaxial flow with the aerosol-laden gas as the combined flow passes through the flow cell. Liu, P. "Generating Particle Beams of Controlled Dimensions and Divergence: II. Experimental Evaluation of Particle Motion in Aerodynamic Lenses and Nozzle Expansions", Aerosol Science and Technology, Volume 22, 1995.

Figure 1B:
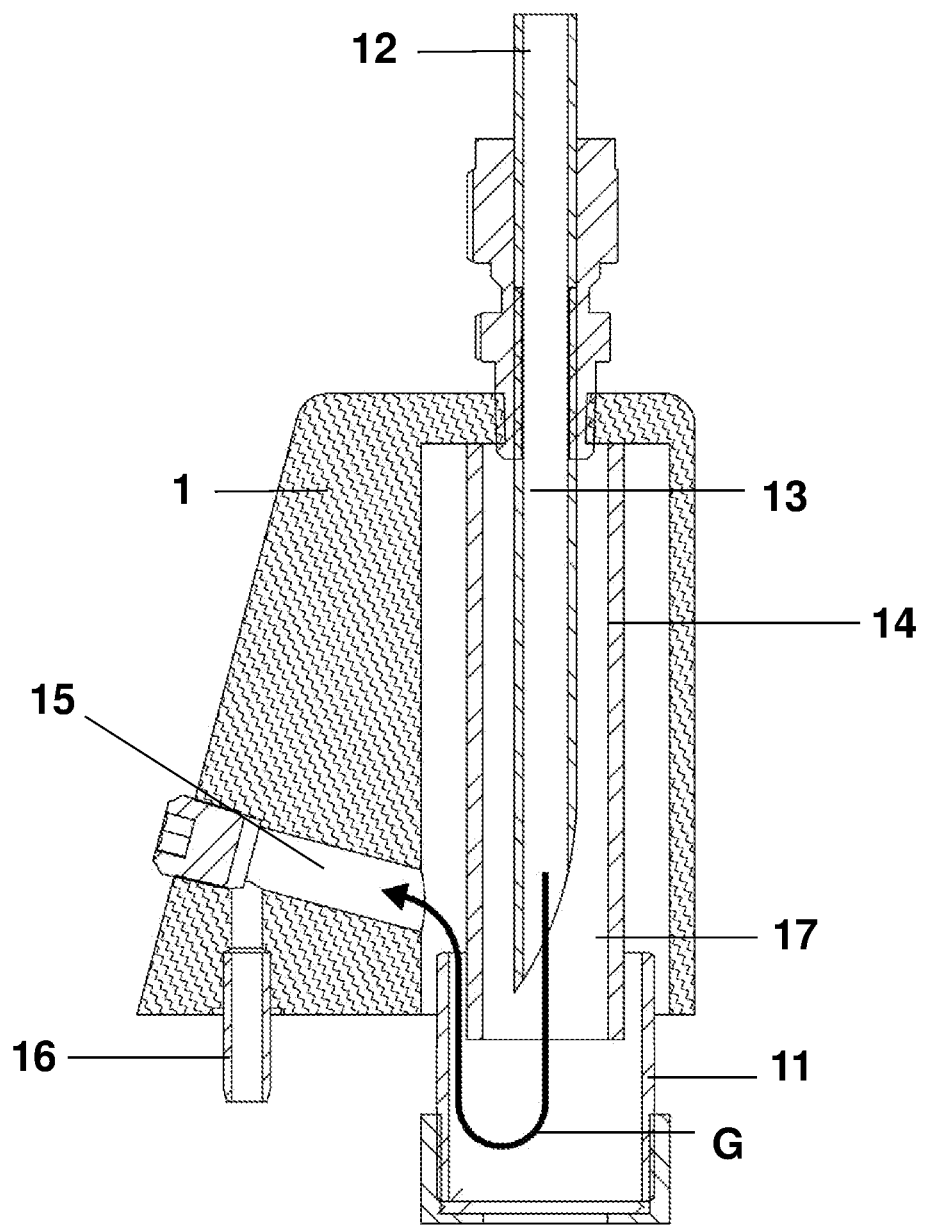
FIG. 1B shows a cross sectional view of the ink cartridge of FIG. 1A with a cylindrical single internal baffle and an aerosol gas tube.

FIG. 1B shows a cross sectional view of the ink cartridge 1 of FIG. 1A. The ink cartridge 1 has an interior surface 13. The ink sample is held in a detachable vial 11. An aerosol transport gas enters the cartridge through a gas inlet tube 12. Aerosolized ink is transported from the aerosol chamber 17 to a flow cell 4 through a slanted channel 15 and vertical channel 16, as detailed in U.S. Pat. No. 10,086,622 B2.

According to embodiments of the present invention, the aerosol gas input provided through aerosol gas tube 12 and the aerosol output ports to the slanted channel 15 are isolated from the ink spout formed during the aerosolization process. Ink film formed on either input or output ports will cause intermittent aerosol delivery, resulting in pulsed deposition at a substrate. In the embodiment of FIG. 1B the aerosol gas tube 12 is positioned so that the gas input therethrough is shielded from the ink spout, and the sample ink held in the detachable vial 11 is isolated from the slanted channel 15 by an internal baffle 14. A constant flow of aerosol-laden gas exits the cartridge at port 16 suitable for aerosol printing.

The ink cartridge and baffles are typically formed from aluminum but may also readily be formed from more chemically resistance materials such as stainless steel or polyether ether ketone (PEEK). The internal baffle 14 is generally a cylindrical shell that functions to isolate the aerosol output channel 15 from the ink spout. It is appreciated that an internal baffle operative in the present invention creates a modified gas flow G.

The internal baffle is within an aerosol chamber and according to the present invention has a variety of shapes as defined by a bottom view or cross-sectional view. The shape of a baffle is selected to ensure there is a degree of isolation of the aerosol output channel from the ink spout so as to inhibit aerosol settling and fluid buildup to such a degree that fluid accumulation within the ink cartridge and transport conduits need not be purged for at least 8 hours. As a result, printing can occur for at least 8 uninterrupted hours.

Internal baffle shapes operative herein illustratively include planar (FIG. 2A), arcuate (FIG. 2B), split cylindrical (FIGS. 2C-2E), angular (FIG. 2F), and complex shapes of S-shaped (FIG. 2G), and Y-shapes (FIGS. 2H-2I). With respect to FIGS. 2A-2I, these shapes typically define an angle α that as shown varies from 5 to 180 degrees. Factors relevant in selecting a given shape for the internal baffle include aerosol droplet size, ink surface tension, temperature, inlet gas flow rate, and gap dimensions along the gas flow G.

As used herein, "continuous printing" is defined as print deposition of ink droplets on a substrate for at least 8 hours without resort to a purge cycle, regardless of whether the purge cycle is automated or manually performed. In contrast, conventional aerosol-based ink cartridges are only capable of about 30 minutes of continuous printing.

Figure 3A:
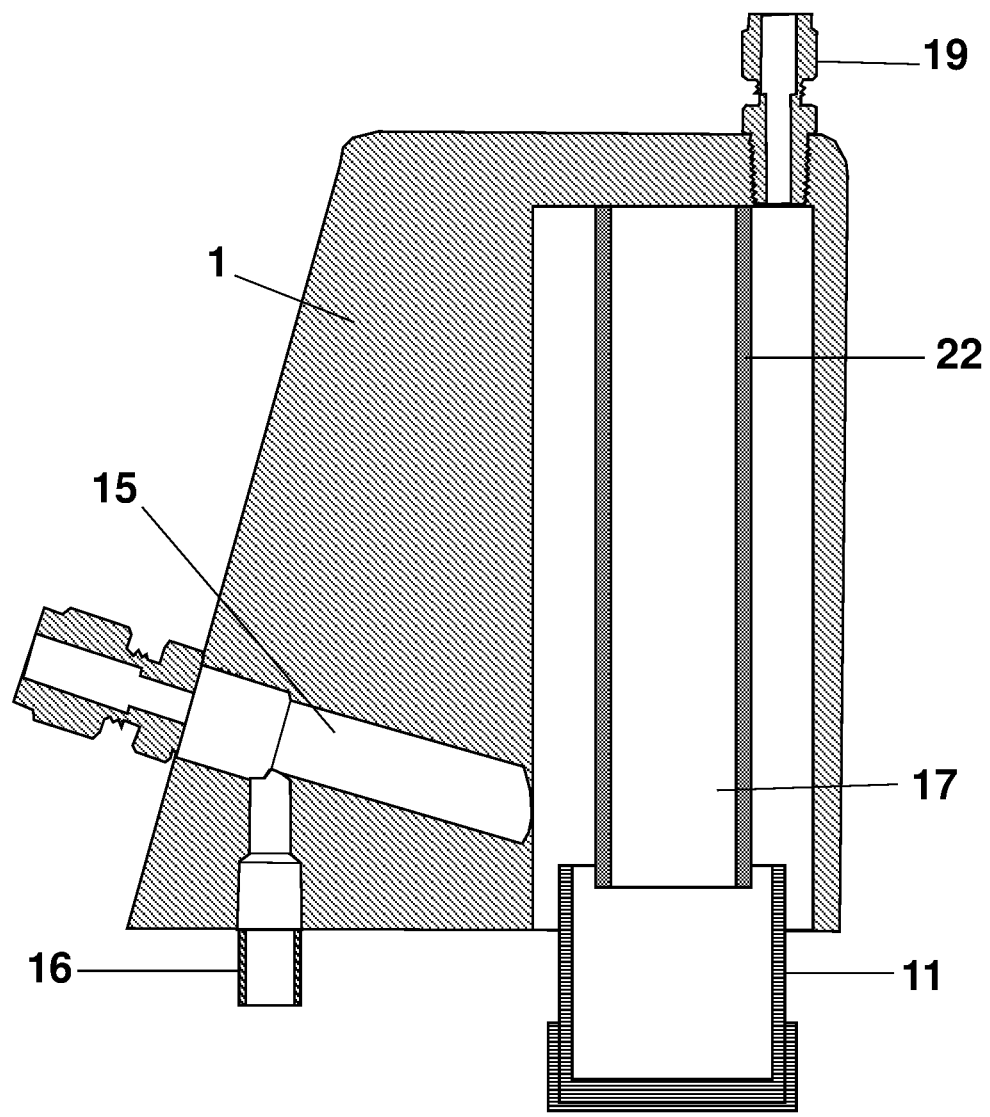
FIG. 3A is a cross sectional view of the ink cartridge of FIG. 1A with a single internal baffle embodiment.
Figure 3B:
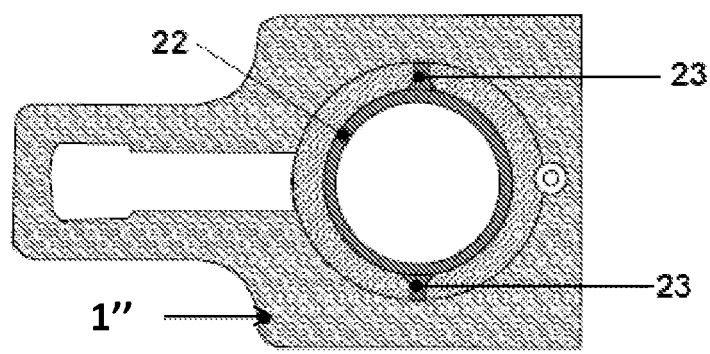
FIG. 3B is a bottom view of the configuration of FIG. 3A showing the orientation of the ribs of the single baffle.
Figure 3C:
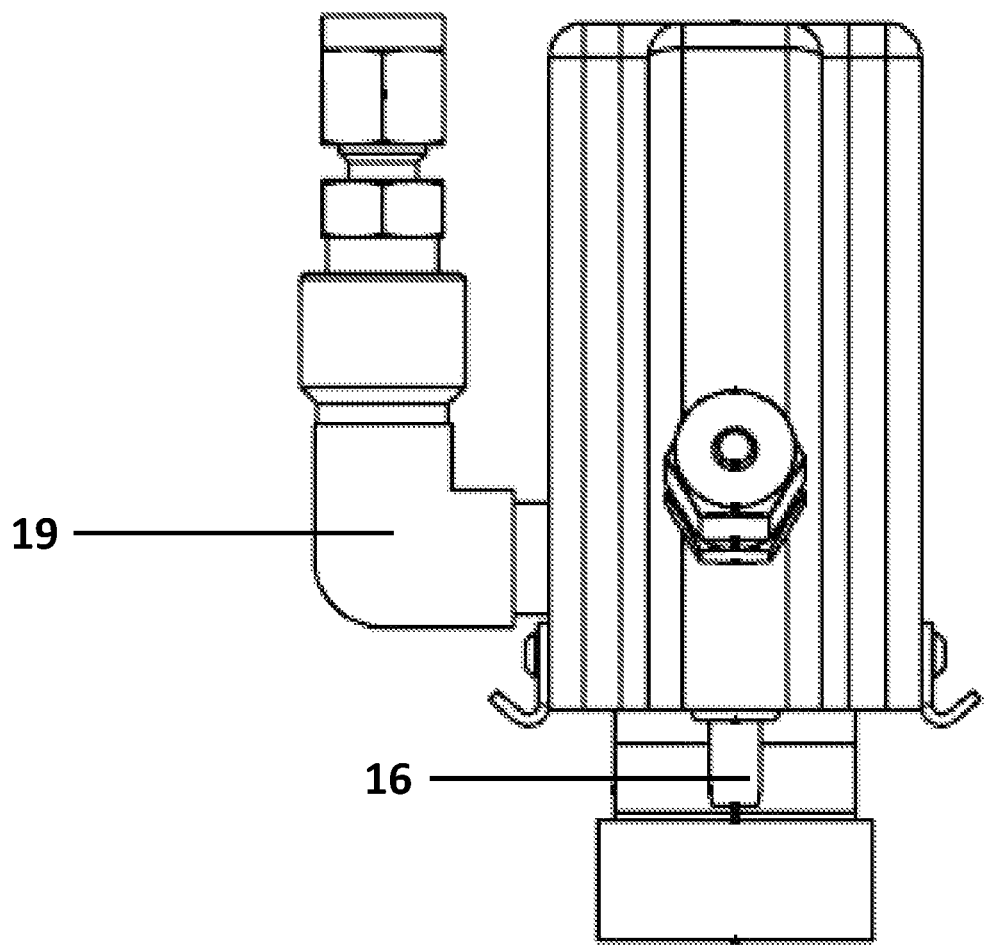
FIG. 3C is a drawing of the configuration of FIG. 1A with a side entry gas inlet.

Another embodiment of the invention is shown in FIG. 3A in which like reference numerals have the aforementioned meanings ascribed thereto. An ink cartridge 1 is provided that includes a single baffle 22 and an aerosol gas input that enters the cartridge along the outside of the baffle 22 via input port 19. As illustrated in FIG. 3B, a set of ribs 23 force the aerosol gas downward, along the baffle 22 and across the bottom of the aerosol chamber 17. The configurations of FIGS. 3A-3C prevent entrainment of fluid at the gas input port 19 and at the aerosol output port 16. A constant flow of aerosol-laden gas exits the cartridge at port 16. Stable aerosol transport is achieved in the present invention by isolating the fluid spout created by the atomization process from the input and output ports of the ink cartridge. As ultrasonic energy is coupled into the ink, the surface of the ink begins to oscillate, and a spout is formed near the center of the fluid. As shown in FIGS. 3A-3C, isolation of the spout from the input and output ports is accomplished using a single baffle and a series of vertical ribs that force the aerosol gas to flow downward into the lower part of the ink cartridge. According to embodiments, aerosolized droplets are entrained in the transport gas and transported from the ink cartridge to the flow cell. FIG. 3C shows a configuration of the cartridge similar to the configuration of FIG. 3A, where the aerosol gas enters the aerosol chamber through port 19 on the side of the cartridge and near the bottom of the aerosol chamber. The aerosol exits the cartridge at port 16. The configuration of FIG. 3C may also be used with an internal baffle without ribs.

Figure 4A:
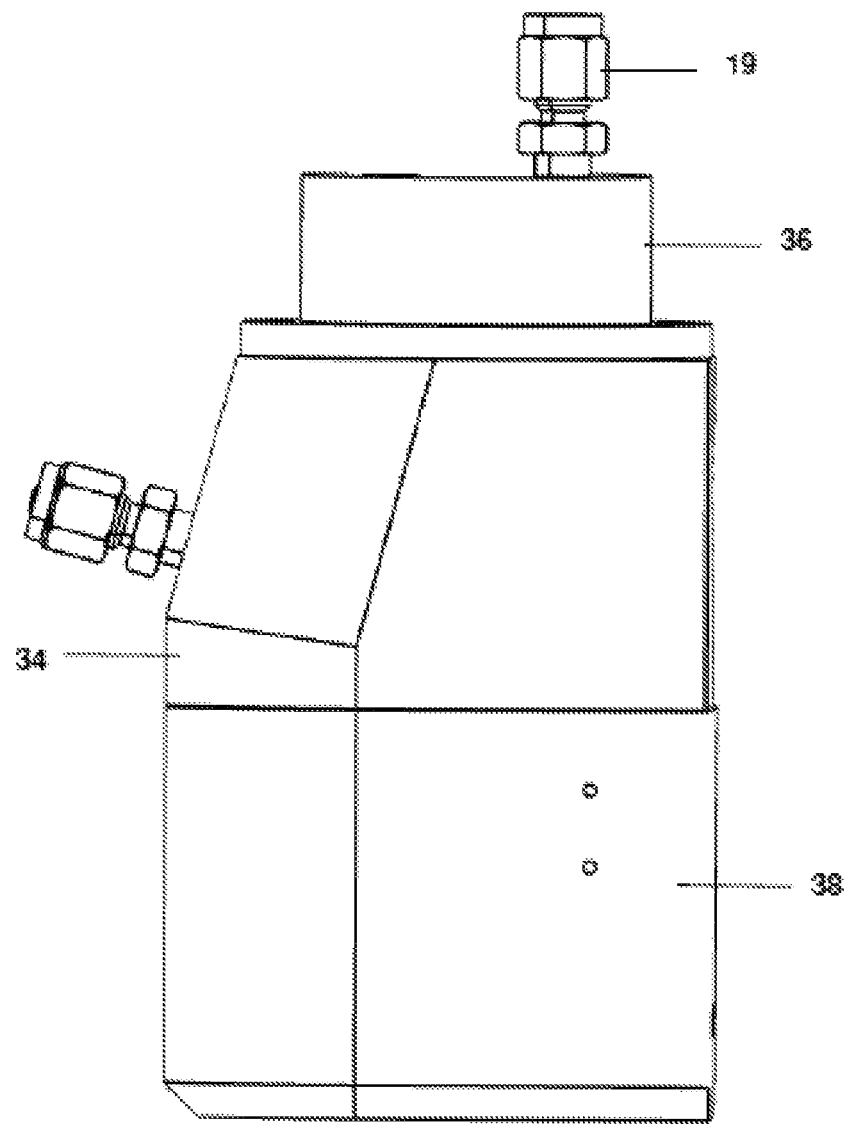
FIG. 4A is a side view of another embodiment of an inventive print head inclusive of an inventive interchangeable ink cartridge, and an atomizer base.
Figure 4B:
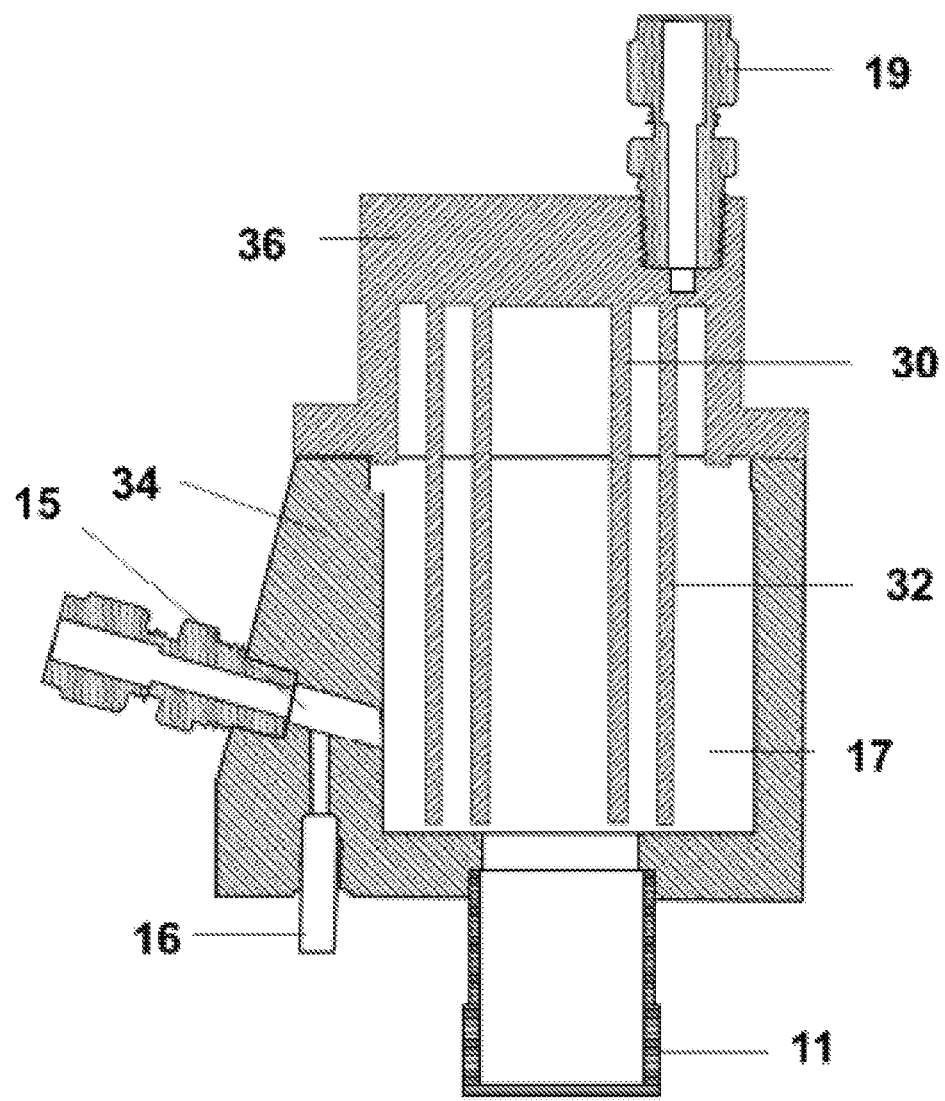
FIG. 4B is a cross sectional view of the ink cartridge of FIG. 4A showing a nested baffle configuration.

According to the embodiment shown in FIG. 4A, the inventive apparatus includes an atomizer base 38, an ink cartridge 34, and an ink cartridge cap 36. The flow paths of the input aerosol gas and the aerosol-laden output gas are generally shown in the cross-sectional view of FIG. 4B. As shown in FIG. 4B, the apparatus includes a set of nested baffles 30 and 32 to isolate the gas input and output from the ink spout. The aerosol transport gas enters the cartridge at input port 19, which is positioned off-axis with respect to the aerosol chamber axis and the ink spout. The aerosol gas flows downward into the aerosol chamber 17 and across the bottom of the baffles 30 and 32. The interior baffle 30 prevents fluid entrainment into the slanted output channel 15 and isolates the gas input from the ink spout, while the exterior baffle 32 forces the aerosol gas to flow downward into the most dense region of aerosol. A constant flow of aerosol-laden gas exits the cartridge at port 16. The two internal concentric cylindrical baffles (30, 32) are used to isolate the ink spout from the gas input and aerosol output ports of the ink cartridge. The nested baffle configuration eliminates fluid entrainment in the gas and aerosol flow paths.

Figure 5A:
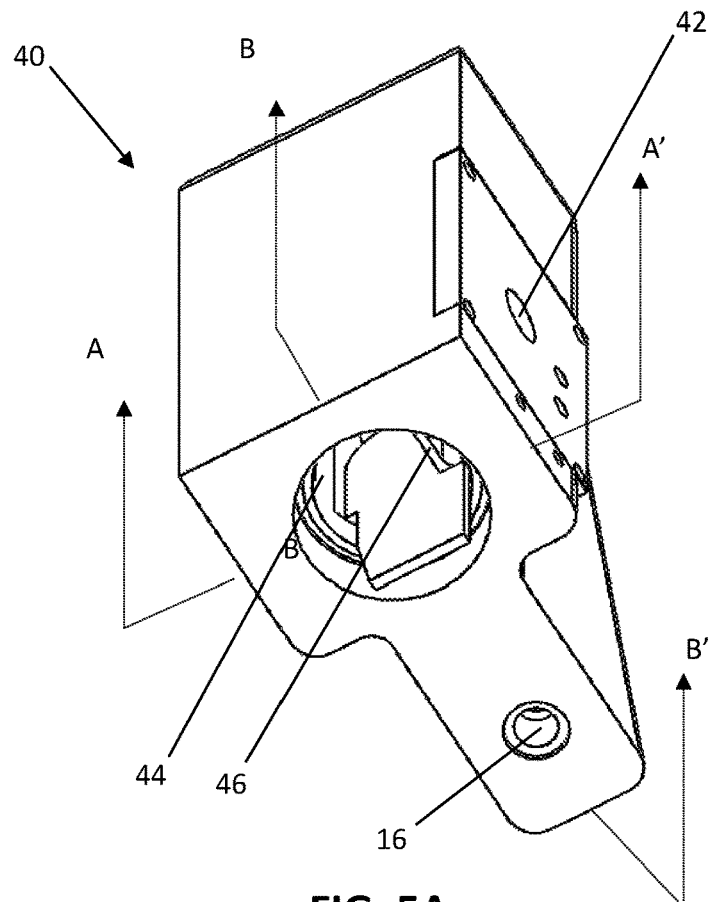
FIG. 5A is a first perspective view of an alternate ink cartridge according to the present invention.
Figure 5B:
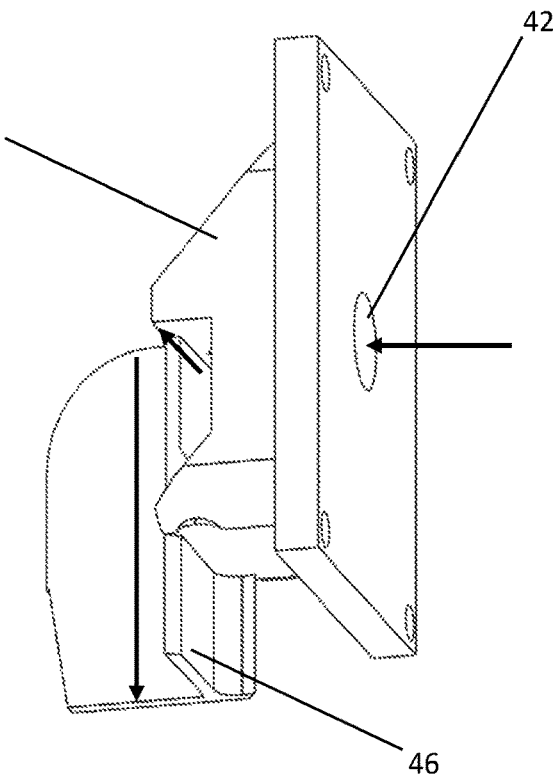
FIG. 5B is a perspective view of a portion of the aerosol chamber and baffle insert of FIG. 5A.
Figure 5C:
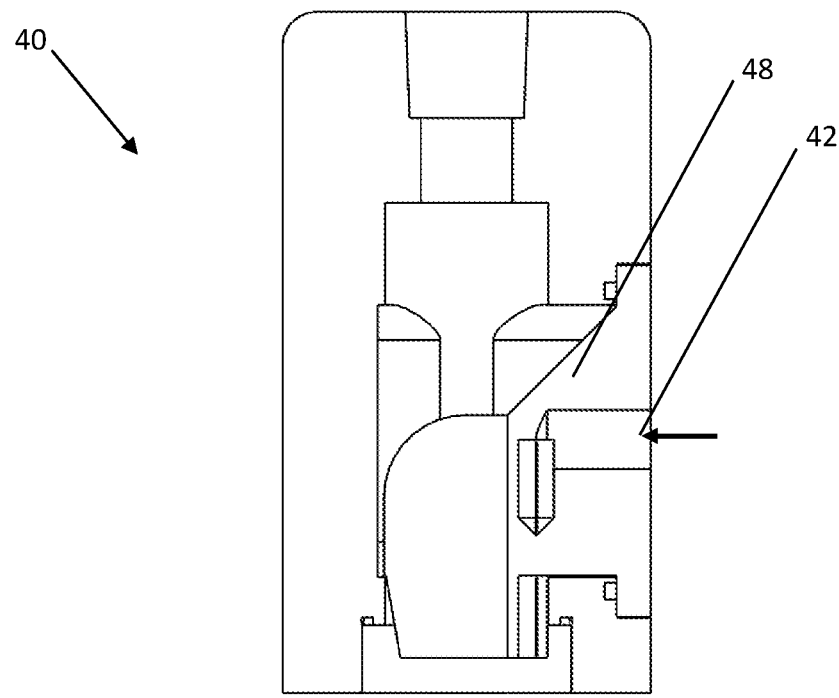
FIG. 5C is a cross-sectional view of the insert of FIG. 5A along the plane A-A'.
Figure 5D:
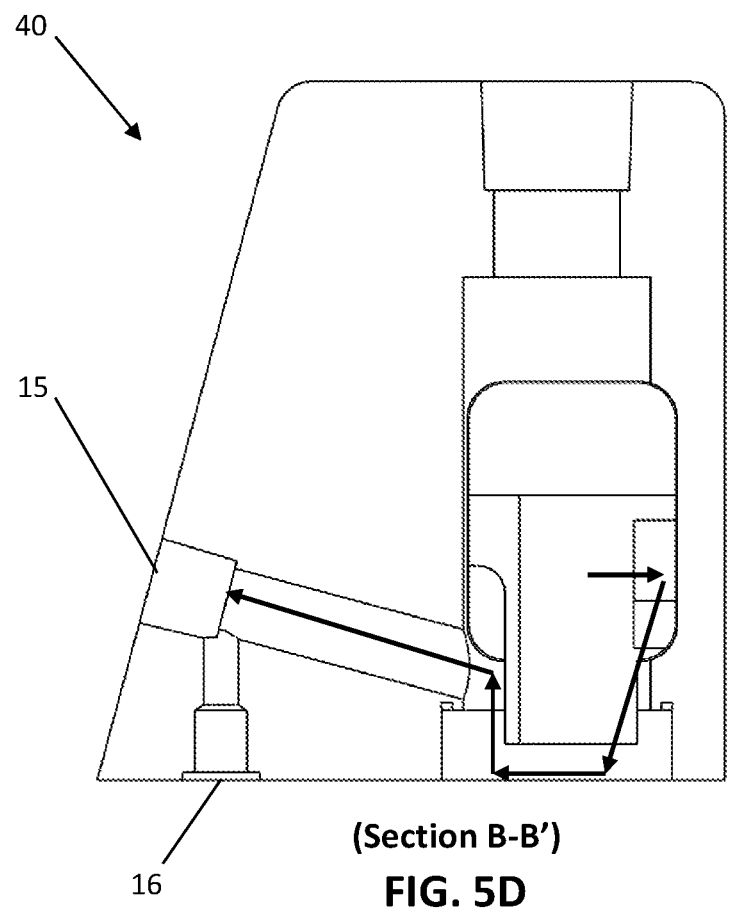
FIG. 5D is a cross-sectional view of the insert of FIG. 5A along the plane B-B'.

As shown in the following drawings, the detachable vial 11 is not shown to better illustrate the internal baffle and the effects thereof on the aerosol gas flow path as shown by the arrows in the figures. FIG. 5A is a first perspective view of an alternate ink cartridge 40 showing the aerosol gas inlet 42, the aerosol chamber 44, and baffle insert 46. FIG. 5B is a perspective view of a portion of the aerosol chamber 44 and baffle insert 46 of FIG. 5A that shows the complex shaped aerosol gas diverter 48 and the backward gas flow. FIG. 5C is a cross-sectional view of the insert of FIG. 5A along the plane A-A' that shows the aerosol gas input 42 and aerosol gas diverter 48. FIG. 5D is a cross-sectional view of the insert of FIG. 5A along the plane B-B' that shows the aerosol gas flow path as it proceeds up the slanted output channel 15 and isolates the gas input 42 from the ink spout 16.

Figure 6A:
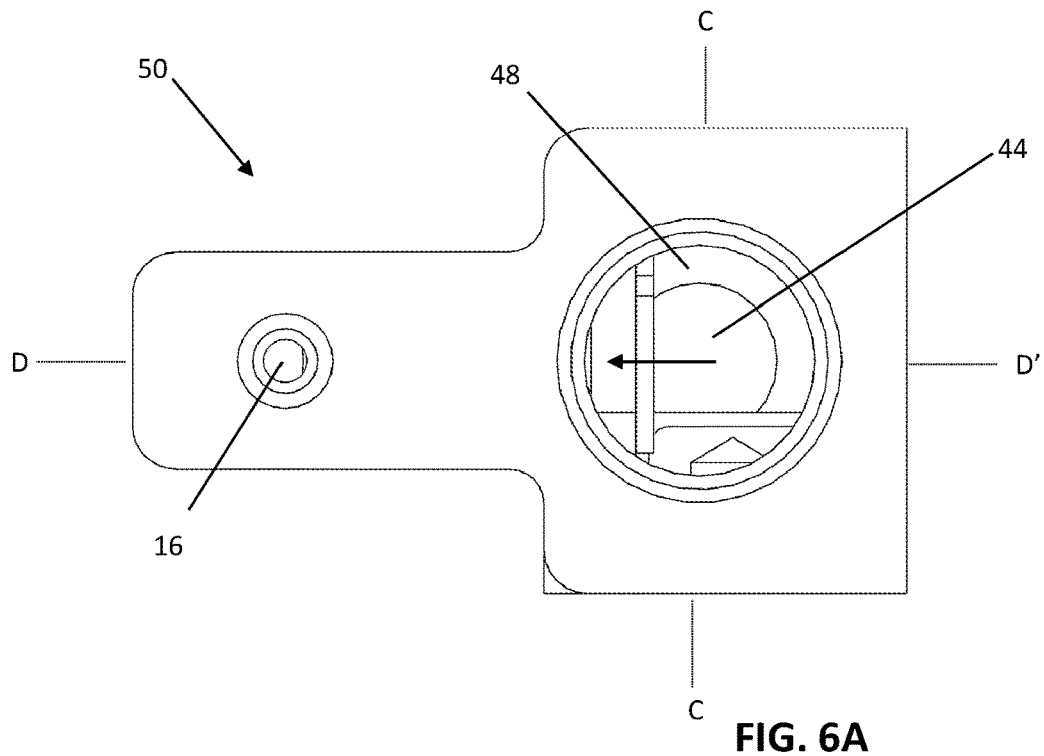
FIG. 6A is a bottom view of another embodiment of a portion of the aerosol chamber and baffle insert in an ink cartridge.
Figure 6B:
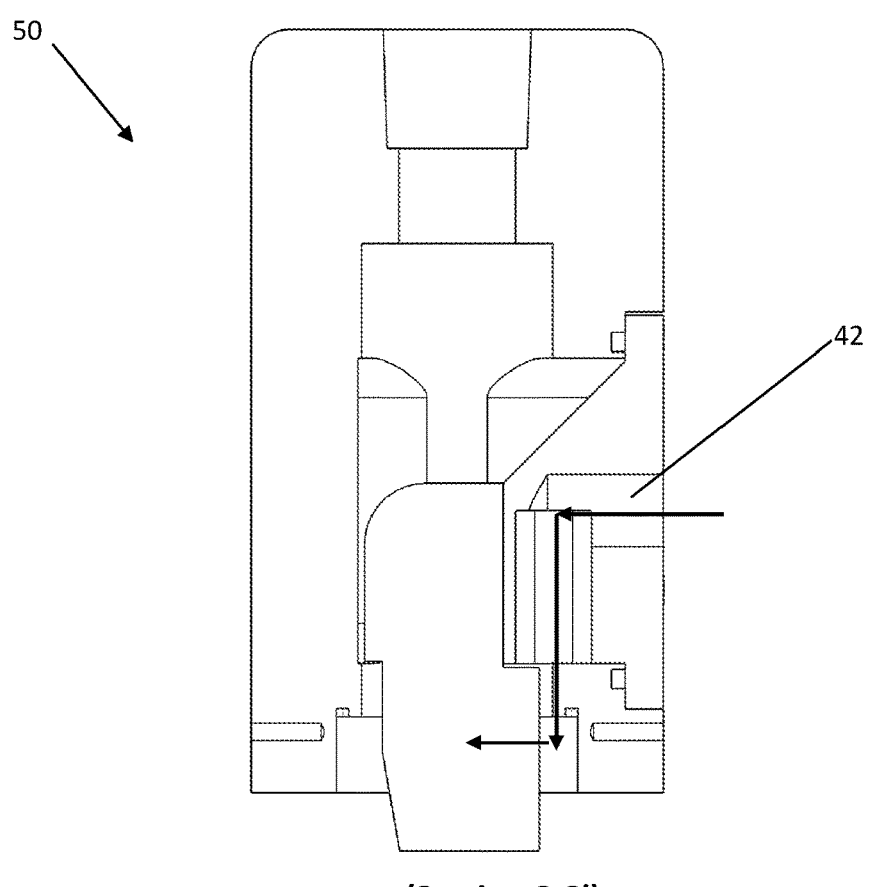
FIG. 6B is a cross-sectional view of the insert of FIG. 6A along the plane C-C'.
Figure 6C:
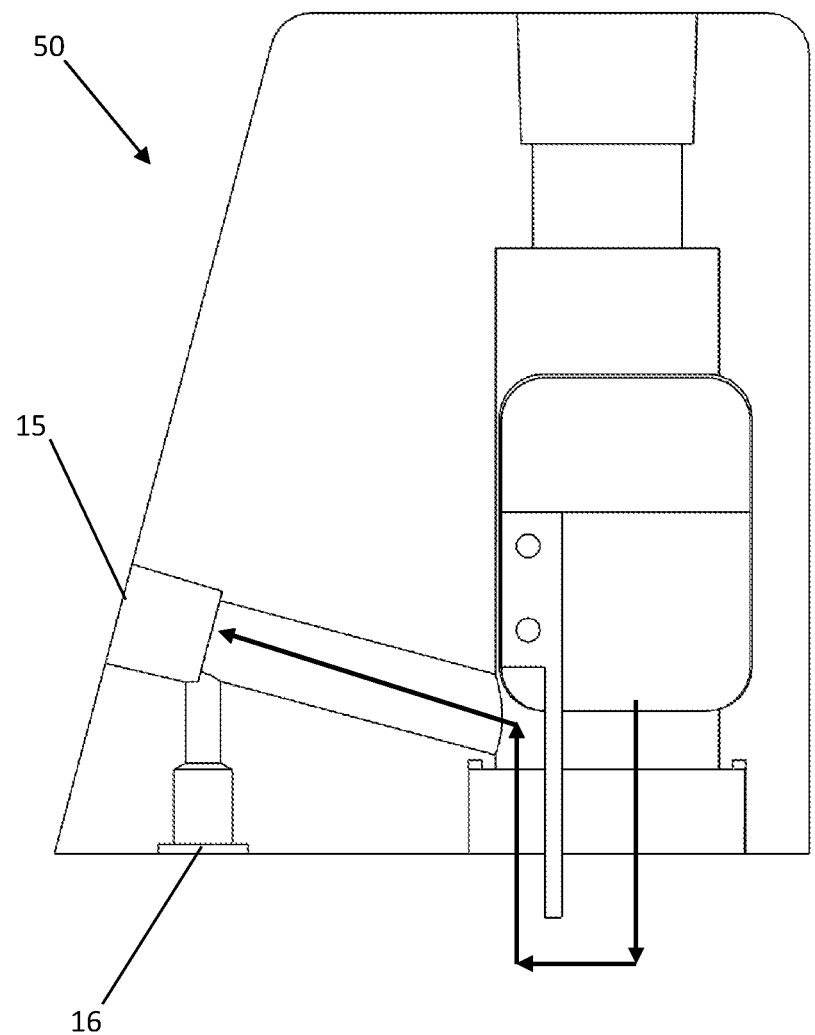
FIG. 6C is a second perspective view of the insert of FIG. 6A along the plane D-D'.

FIG. 6A is a bottom view of another embodiment of a portion of the aerosol chamber 44 and baffle insert 48 in an ink cartridge 50. FIG. 6B is a cross-sectional view of the insert of FIG. 6A along the plane C-C'. FIG. 6C is a second perspective view of the insert of FIG. 6A along the plane D-D'.

Figure 7A:
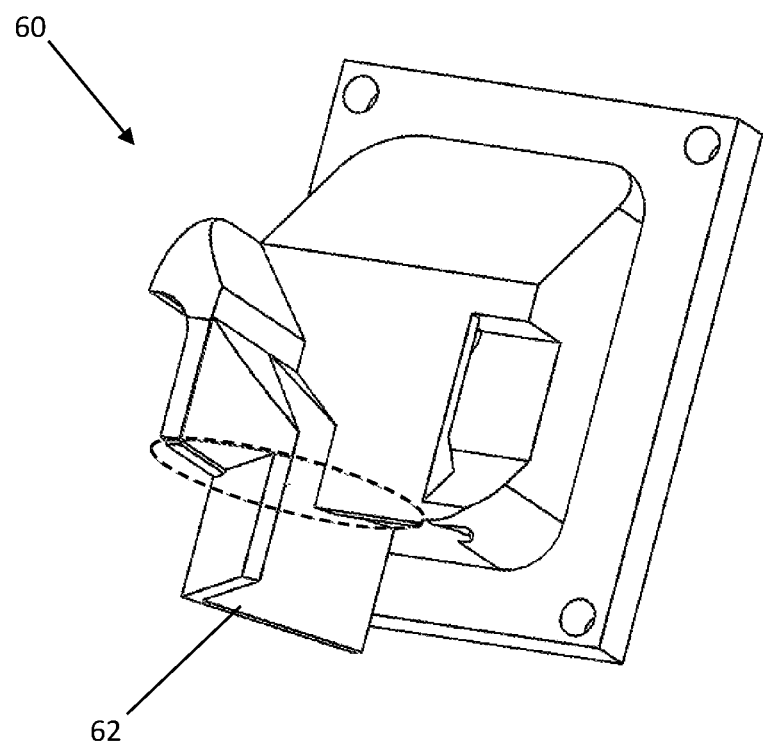
FIG. 7A is a first perspective view of another embodiment of aerosol chamber and baffle insert.
Figure 7B:
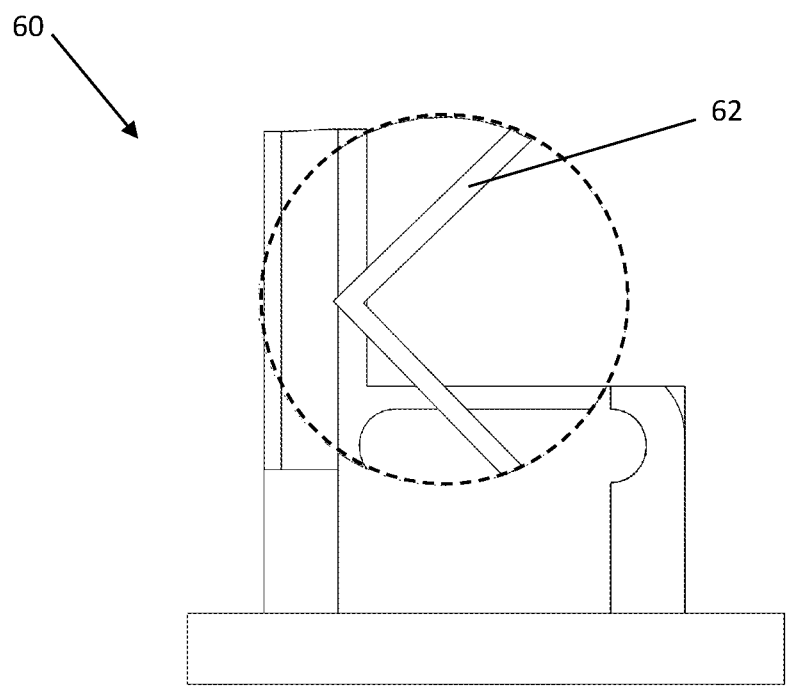
FIG. 7B is a partial cutaway view around the circle in the lower left of the insert of FIG. 7A.
Figure 7C:
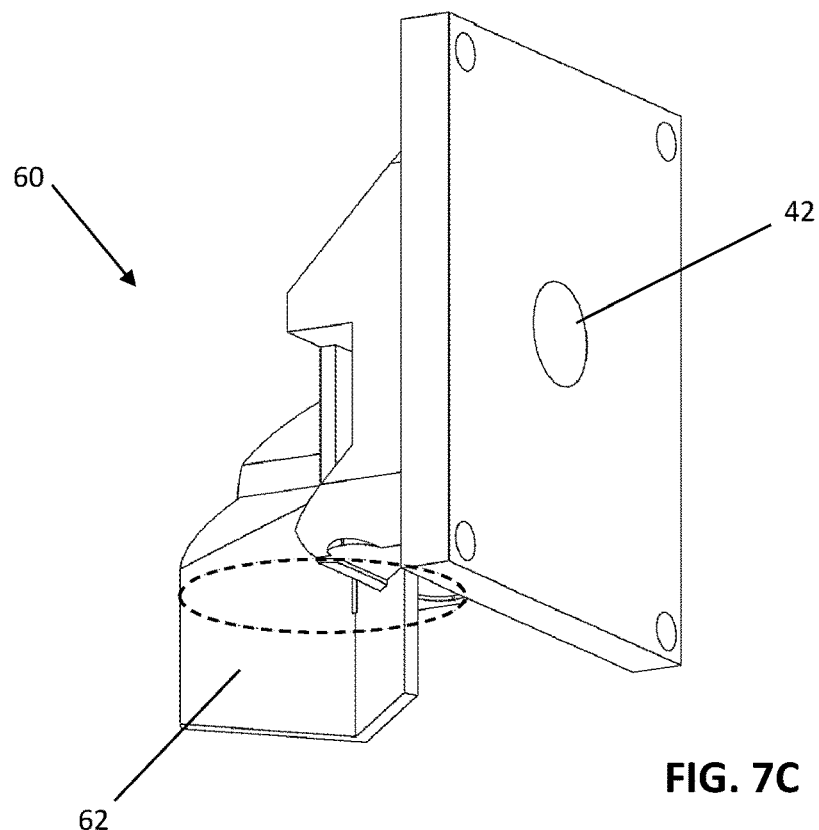
FIG. 7C is a second perspective view of a portion of the aerosol chamber and baffle insert of FIG. 7A.
Figure 7D:
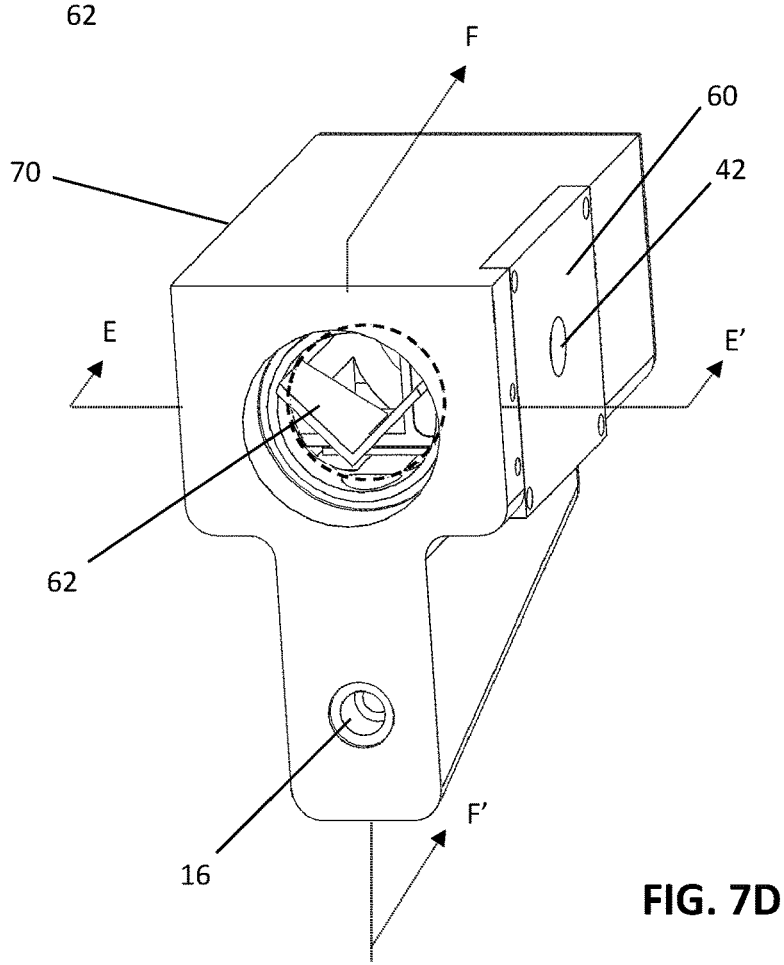
FIG. 7D is a bottom perspective view of the upper portion of the aerosol chamber and baffle insert of FIG. 7A in an inventive ink cartridge.
Figure 7E:
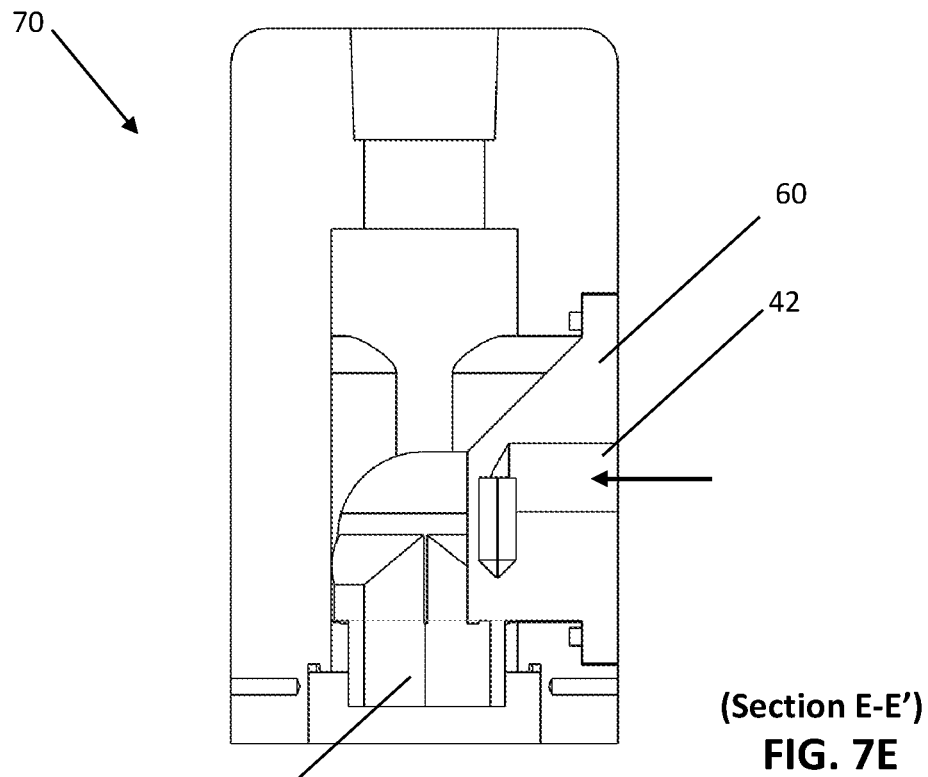
FIG. 7E is a cross-sectional view of the insert of FIG. 7D along the plane E-E'.
Figure 7F:
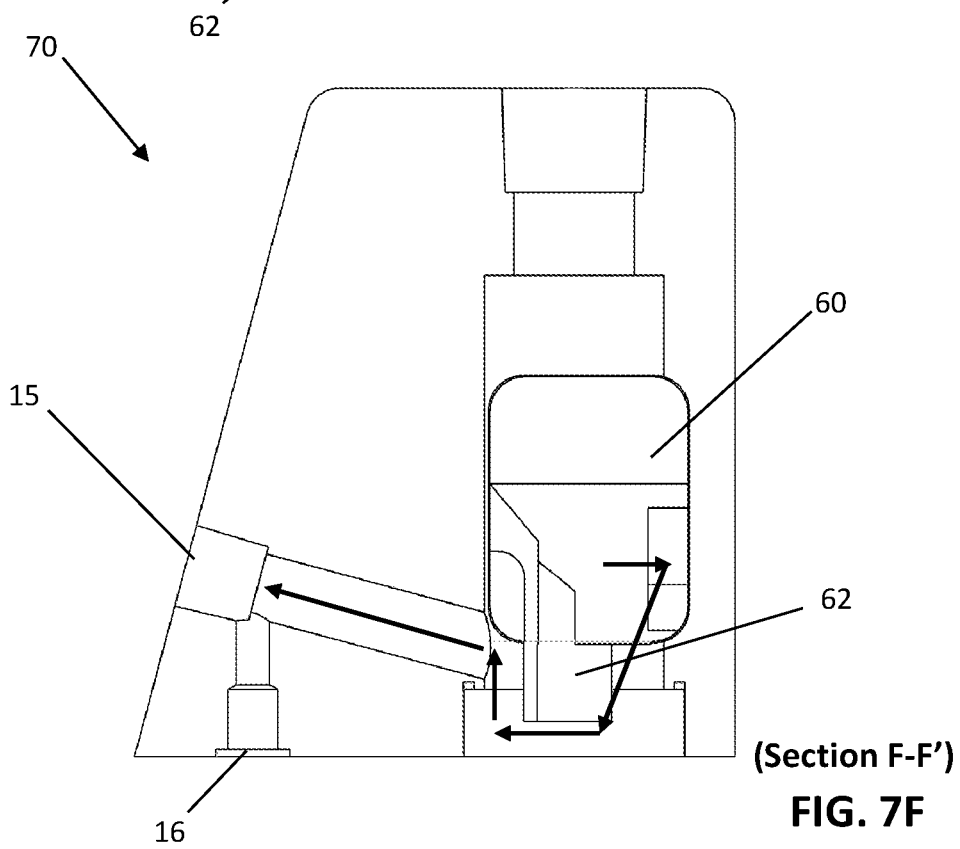
FIG. 7F is a cross-sectional view of the insert of FIG. 7D along the plane F-F'.

FIG. 7A is a first perspective view of another embodiment of aerosol chamber and baffle insert 60 that acts as an aerosol gas diverter with an angular baffle 62. FIG. 7B is a partial cutaway view around the dotted line circle in the lower left of the insert 60 of FIG. 7A. FIG. 7C is a second perspective view of a portion of the aerosol chamber and baffle insert 60 of FIG. 7A. FIG. 7D is a bottom perspective view of the upper portion of the aerosol chamber and baffle insert 60 of FIG. 7A in an inventive ink cartridge 70. FIG. 7E is a cross-sectional view of the baffle insert 60 of FIG. 7D along the plane E-E'. FIG. 7F is a cross-sectional view of the baffle insert 60 of FIG. 7D along the plane F-F'.

Figure 8A:
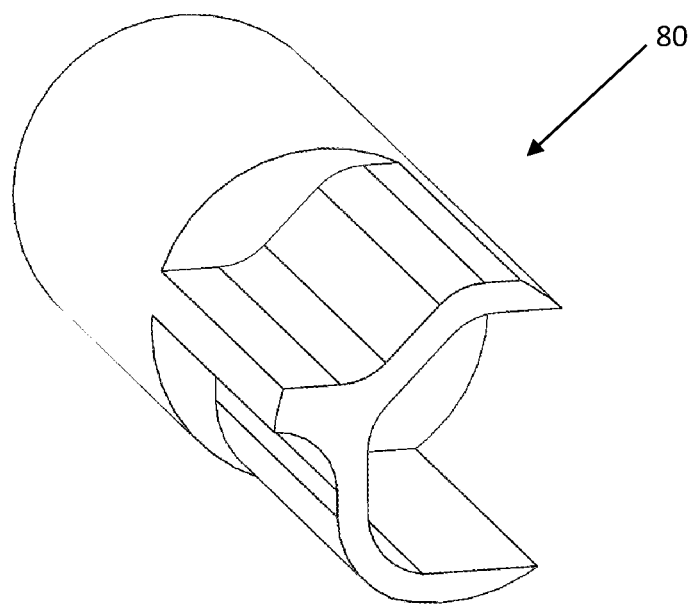
FIG. 8A is a perspective view of another embodiment of a portion of an aerosol chamber and baffle insert.
Figure 8B:
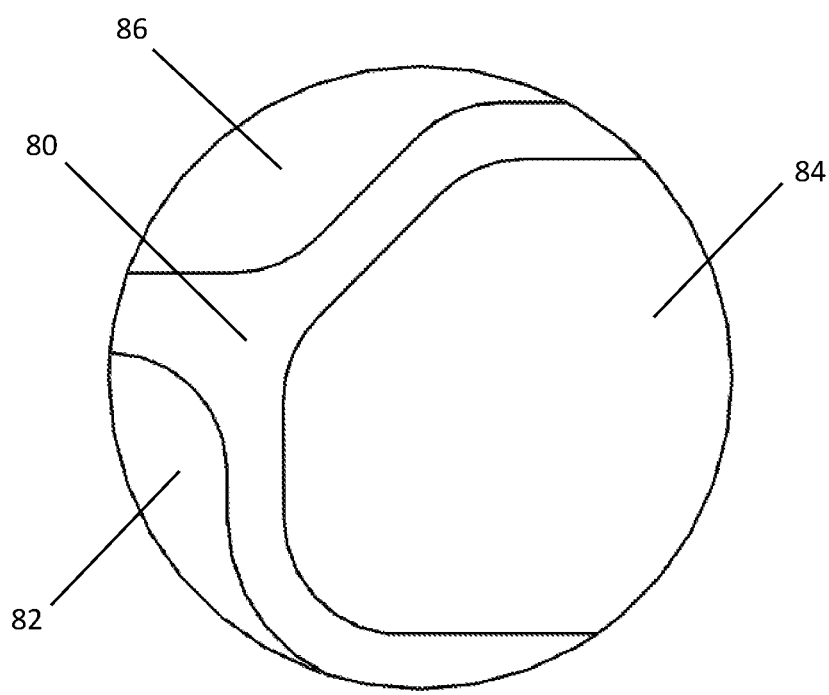
FIG. 8B is an enlarged bottom view of insert of FIG. 8A.
Figure 8C:
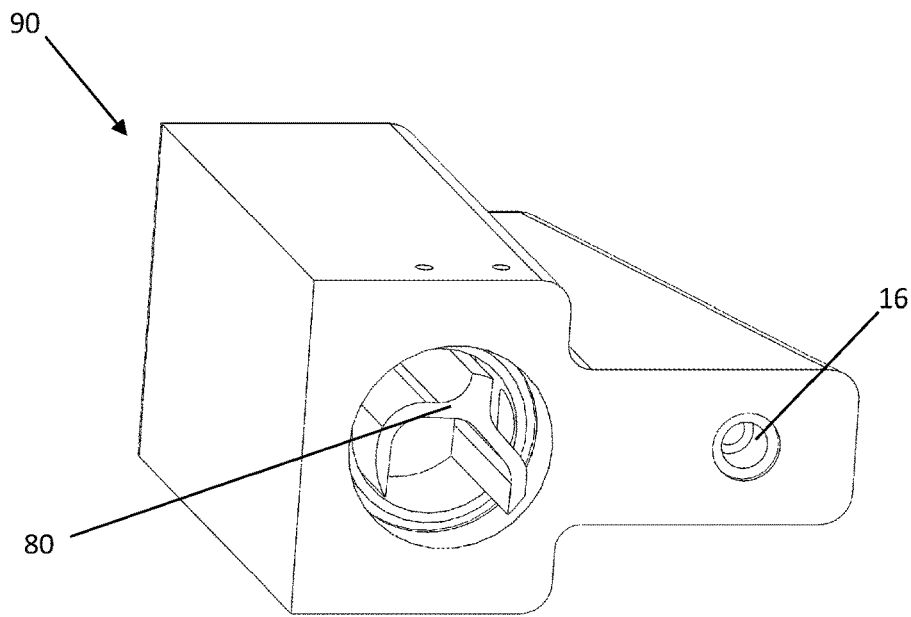
FIG. 8C is a bottom perspective view of the insert of FIG. 8A in the context of an ink cartridge.
Figure 8D:
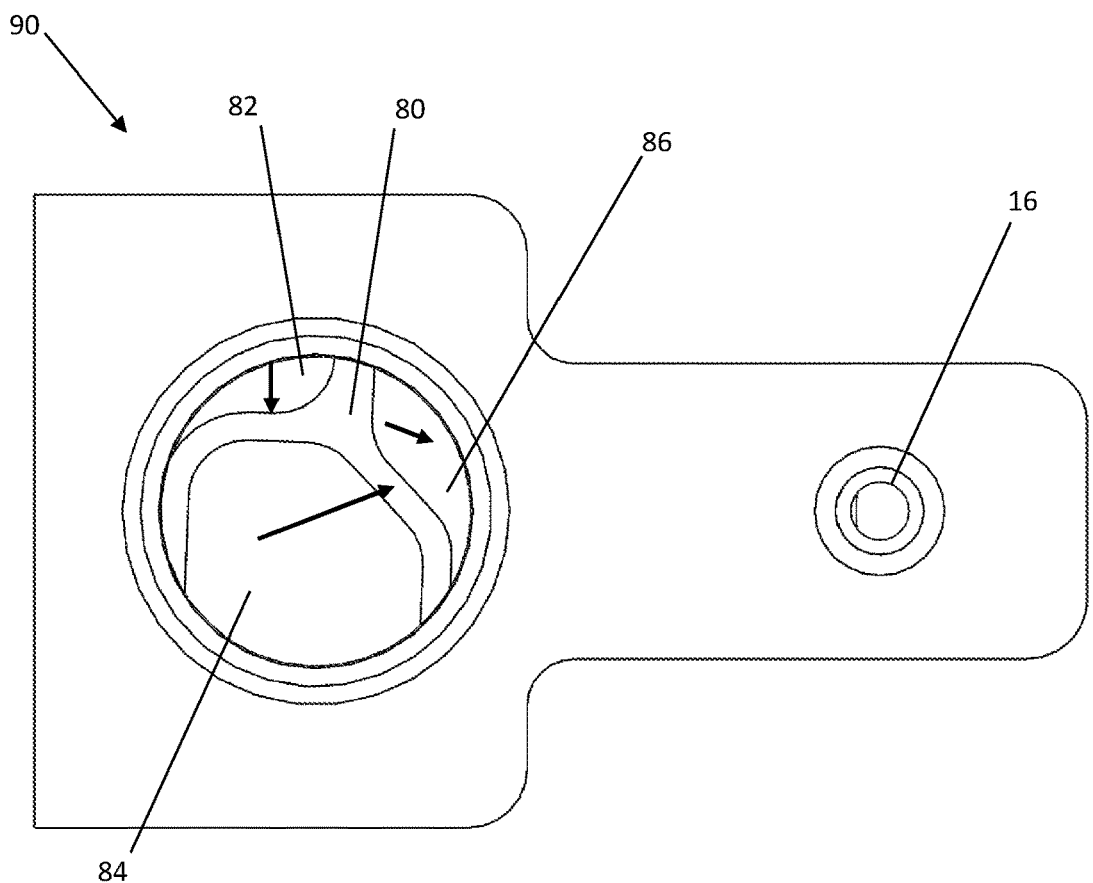
FIG. 8D is a bottom view of the cartridge of FIG. 8C.

FIG. 8A is a perspective view of another embodiment of a portion of an aerosol chamber and baffle insert 80. FIG. 8B is an enlarged bottom view of baffle insert 80 of FIG. 8A that shows the division of the aerosol chamber into an aerosol gas input region 82, an aerosol generation chamber 84, and an aerosol ink laden output region 86. FIG. 8C is a bottom perspective view of the baffle insert of FIG. 8A in the context of an ink cartridge 90. FIG. 8D is a bottom view of the ink cartridge 90 of FIG. 8C.

It is to be understood that the footprint of the embodiments of ink cartridges (1, 40 50, 70, 90) are equivalent and allow for interchangeable use on a printing machine.

The invention embodiments provide for a method and apparatus for direct printing of high-density, high-definition features on a substrate in ambient conditions. Of particular interest is the provision of a process and apparatus for stable and repeatable deposition of liquids onto substrates for additive manufacturing applications, including but not limited to metallization of rigid and flexible substrates, deposition of inorganic and organic samples for sensor applications, and deposition of various inks for green energy applications such as solar cell metallization and fuel cell production. According to embodiments, the inventive apparatus is capable of printing 10-micron wide lines with 10-micron spacing, enabling high-density applications such as interconnect redistribution.

According to embodiments, a constant aerosol output is supplied to a surface to enable printing of high-definition high density patterns. The aerosol output rate to the surface is held constant by minimizing pulsing of the aerosol flow at the aerosol output port of the ink cartridge, by maintaining a constant gas flow rate to and from the cartridge, and by maintaining a constant aerosol density in the region where aerosol is extracted from the cartridge. According to embodiments, the present invention minimizes the horizontal distance the aerosol must travel to exit the ink cartridge. For the aerosol droplet diameter distribution produced by a common atomizer, aerosol settling occurs after approximately five to ten millimeters of horizontal travel. Aerosol settling can lead to fluid accumulation within the ink cartridge, causing variations in the aerosol output rate. The present invention therefore limits the horizontal travel of the aerosol-laden gas to no more than approximately ten millimeters, according to embodiments.

Entrainment of ink at the ink cartridge gas input or aerosol output can lead to pulsing or variation in the aerosol output to the surface. Ink entrained at the output or input ports can form a film that partially or completely blocks the port. Entrainment of ink in the input and output ports of the ink cartridge leads to variability in the aerosol output rate as the ports are alternately blocked and cleared. Correspondingly, the internal pressure of the cartridge increases and decreases. Variation in the mass flux of aerosol delivered to a surface therefore results in variation of the printed trace line width, leading to bulging or necking of the trace that can adversely affect the electrical and mechanical properties of the deposited trace. Blockages result in a momentary decrease in the aerosol output followed by an increase in aerosol output rate as pressure builds and the blockage is cleared when the pressure rises above a critical value. According to the present invention, pulsing or variation in aerosol output is avoided by using a combination of baffles, or a baffle and a set of vertical ribs that isolate the gas input port and aerosol output port from the ink spout produced by the ultrasonic aerosolization process.

Another feature provided according to embodiments of the present invention is a constant aerosol gas flow rate in order to produce a constant aerosol output. The present invention uses mass flow controllers to maintain the aerosol gas flow rate to within approximately 2 percent or less of a set aerosol gas flow value. Similarly, the aerosol gas output rate is held constant by achieving a saturated or near-saturated aerosol density within the ink cartridge volume. When a condition of saturated aerosol density is reached, small variations in the production of aerosol result in little or no change in the ink chamber aerosol density, allowing for a constant aerosol output.

High-output, low gas flow rate atomizers enable production of a dense, narrowly dispersed aerosol distribution that is highly stable and tuned to the optimum or near optimum size range of the focusing assembly. According to embodiments, a tunable or fixed-frequency atomizer, an interchangeable and adjustable single-stage or multi-stage aerodynamic lens system, and an annularly flowing sheath gas are used. The combination of a co-axial sheathed flow and the use of aerodynamic lenses forms a hybrid hydrodynamic/aerodynamic focusing apparatus that collimates and deposits a stream of particles with diameters in the range of approximately 0.5 to 5 microns.

In hydrodynamic focusing, an inner fluid or aerosol-laden gas stream is surrounded by a co-propagating annular sheath fluid or gas. As the combined streams flow through an orifice or a series of orifices, the volume available for the inner flow is reduced by the volume occupied by the outer sheath flow. Hydrodynamic focusing occurs when the reduction in the inner flow volume results in a decrease in the diameter of the inner stream, with the decrease in the inner stream diameter being proportional to the ratio of the aerosol to sheath gas flow rates.

An aerodynamic lens is a flow configuration in which a particle-laden gas traveling through a cylindrical channel is passed through an orifice, with the gas undergoing one contraction upstream of the orifice and one subsequent and immediate expansion downstream of the orifice. A contraction of an aerosol stream is produced as the flow approaches and passes through the orifice. The gas then undergoes an expansion as the flow propagates downstream into a wider cross-sectional area. Flow through the orifice forces particles towards the flow axis, so that the aerosol stream is narrowed and collimated.

The ability to focus a droplet entrained in a gas stream is related to the Stokes number, St, of the droplet. It is generally accepted that optimum focusing of an aerosol is obtained when St is equal to unity. Unfocused droplets can be generally categorized as overspray or satellite deposition. Overspray deposition occurs when small droplets pass through the lens assembly with a small Stokes number without achieving a Stokes number near unity at any stage of the assembly. Satellite droplets are conversely generated when large droplets pass through each stage of the assembly with Stokes number much greater than unity.

Yet another unique aspect of the invention is the ability to print high-density circuits in two or three dimensions. In particular, high-definition high-density 3D circuits can be printed wherein conductive layers are isolated by insolating layers, with interconnecting vias that transport power and signals between conductive layers.

The interchangeable ink cartridge of the print module can be used to print multi-layer multi-material circuits wherein vertical interconnects are formed between insulated conducting layers. According to embodiments, the inventive apparatus facilitates printing of multi-layer vertical circuits since a single tool, the flow cell, is used to print each layer. Conductive layers are connected by directly printing vias in the insulating layers and printing an interconnect in the via to connect two successive conductive layers.

Another unique aspect to the present invention is the elimination of the requirement for tool offset definition between printing of single or multi-layer multi-material circuits. In the multi-layer print process, the tool (the flow cell) remains fixed, and the printed material is varied using interchangeable ink cartridges. In such a method, high-accuracy printing can be performed since each layer is assigned the same reference point, and since the need to determine the vector distance between two or more print tools is eliminated.

According to embodiments, the substrate is attached to a platen mechanically or using a vacuum. The platen is connected to a multi-axis motion control system so that when combined with an aerosol shuttering process, the atomizer, flow cell, motion control, and platen assembly enable printing and material processing of discreet patterns and structures on the substrate. The platen is capable of being heated to approximately 150° C., enabling real-time curing or sintering of deposited material.

According to embodiments, the apparatus includes multi-nozzle arrays. In a multi-nozzle configuration, an assembly including several exit nozzles with sheathed flows is fabricated, for example in a linear array, so that simultaneous deposition from each nozzle is enabled.

According to embodiments, the present invention can also be used to build three-dimensional structures using a layer-wise process, wherein simple and complex objects are printed directly from a computer-automated drawing (CAD) file. In the 3D printing process, laser-assisted deposition or a viscoelastic ink is used to deposit a liquid filament with a viscosity large enough to form a rigid or semi-rigid structure upon which subsequent layers are deposited. In the 3D printing technique, a digital model of an object is intersected with horizontal planes. The horizontal planes form cross sectional representations or slices of the object. Information in each slice is uploaded to a computerized motion control system, so that a solid object can be fabricated using an additive manufacturing process. The process can be used to fabricate three-dimensional objects from materials including, but not limited to metals, ceramics, and plastics.

The inventive apparatus also enables printing of multi-layer high-definition circuits or patterns. A high-definition high-density printed circuit or pattern is defined as an assembly of traces having line widths of approximately 30 microns or less, with a spacing of approximately 50 microns or less. The current invention uses interchangeable ink cartridges or a multi-material print head to print high-definition high-density circuits or patterns.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. An aerosol printing ink jet cartridge comprising:
a housing having an interior wall defining an interior chamber;
a detachable vial adapted to store an aerosol ink and configured to fluidly communicate with the interior chamber of said housing;
at least one internal baffle extending from the interior wall of the said housing and positioned within the interior chamber of said housing, said at least one internal baffle configured to at least partially extend into said detachable vial to define an aerosol chamber;
a gas inlet tube adapted to provide an inlet gas into the interior chamber; and
an outlet channel in fluid communication with the aerosol chamber through which aerosol ink as particles are outputted, said outlet channel isolated from the aerosol ink in said detachable vial by said at least one internal baffle.

2. The cartridge of claim 1 wherein said at least one baffle is a single baffle.

3. The cartridge of claim 2 wherein said single baffle is planar.

4. The cartridge of claim 2 wherein said single baffle is arcuate.

5. The cartridge of claim 2 wherein said single baffle is a split cylinder.

6. The cartridge of claim 2 wherein said single baffle is angular.

7. The cartridge of claim 2 wherein said single baffle is S-shaped or Y-shaped.

8. The cartridge of claim 1 wherein said at least one baffle further comprises a set of ribs projecting outward, downward, or both outward and downward from said at least one baffle.

9. The cartridge of claim 1 wherein said gas inlet tube is in communication directly into the aerosol chamber.

10. The cartridge of claim 1 wherein said gas inlet tube or a gas inlet port is in communication adjacent to the aerosol chamber.

11. The cartridge of claim 1 wherein said outlet channel comprises a slanted channel joining a port.

12. An apparatus for printing discrete high-resolution high-density features on a surface using an aerosol stream, the apparatus comprising;
a cartridge according to claim 1;
an atomizer positioned to atomize the aerosol ink;
a flow cell comprising at least one aerodynamic lens and one converging fluid dispensing nozzle with a sheath gas flow therearound; and
a non-contact pneumatic shuttering assembly positioned to selectively interfere with a stream from said nozzle.

13. The apparatus of claim 12 wherein the atomizer includes an ultrasonic transducer configured to nebulize the ink.

14. The apparatus of claim 12 wherein the at least one aerodynamic lens has an operational range matched to a mean diameter of the atomizer aerosol distribution for the purpose of collimating medium-size particles.

15. The apparatus of claim 12 wherein the sheath flow rate of the fluid through an aerodynamic lens assembly and an exit nozzle is set to accommodate the large and small particles in the aerosol distribution for the purpose of focusing particles at either end of said size distribution.

16. The apparatus of claim 12 wherein the non-contact pneumatic shuttering assembly is internal to the apparatus.

17. A method of printing traces on a substrate using the apparatus of claim 12, the method comprising:
providing the aerosol ink in said vial;
inputting an aerosol transport gas into the cartridge through said gas inlet tube;
nebulizing the aerosol ink using an ultrasonic transducer of said atomizer to create an aerosol-laden gas;
introducing a sheath gas into the atomizer through a port to form an annular coaxial flow with the aerosol-laden gas to create a combined flow;
passing the combined flow through the flow cell; and
outputting the aerosol-laden gas from an output port at a constant flow rate, the outputting being under ambient conditions of standard temperature and pressure.

18. The method of claim 17 further comprising unassisted printing continuously for between 8 and 24 hours.

19. The method of claim 17 wherein the substrate is an additive manufacturing applications substrate, sensor application substrate, a solar cell metallization substrate, or a fuel cell substrate.

20. The method of claim 17 used for printing circuits in two or three dimensions.

\* \* \* \* \*